(12) United States Patent
Sumiyama et al.

(10) Patent No.: US 7,365,869 B1
(45) Date of Patent: Apr. 29, 2008

(54) IMAGE FORMING APPARATUS

(75) Inventors: Hiroshi Sumiyama, Aichi-Ken (JP);
Junko Natsume, Aichi-Ken (JP);
Kazuo Inui, Toyohashi (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 0 days.

(21) Appl. No.: 09/238,163

(22) Filed: Jan. 28, 1999

(30) Foreign Application Priority Data

Jan. 28, 1998 (JP) .................................. 10-016098

(51) Int. Cl.
G06F 15/00 (2006.01)
G06K 1/00 (2006.01)
G06K 15/00 (2006.01)

(52) U.S. Cl. .................. 358/1.14; 358/1.13; 358/1.15; 358/1.16; 358/1.17; 358/1.18

(58) Field of Classification Search ............... 358/1.14, 358/1.15, 1.1, 1.17, 1.16, 1.13, 437, 448, 358/468, 1.18; 355/114, 127, 132, 133
See application file for complete search history.

(56) References Cited

U.S. PATENT DOCUMENTS

| 5,097,341 | A |   | 3/1992 | Forest ........................ 358/296 |
|---|---|---|---|---|
| 5,113,520 | A | * | 5/1992 | Hirata et al. .................. 710/45 |
| 5,152,001 | A | * | 9/1992 | Hanamoto .................. 395/800 |
| 5,170,397 | A | * | 12/1992 | Hurtz et al. ................ 371/16.4 |
| 5,206,735 | A |   | 4/1993 | Gauronski et al. .......... 358/296 |
| 5,243,381 | A |   | 9/1993 | Hube ........................ 355/204 |
| 5,251,297 | A | * | 10/1993 | Takayanagi .................. 345/530 |
| 5,377,016 | A |   | 12/1994 | Kashiwagi et al. |
| 5,422,729 | A | * | 6/1995 | Yoshida ....................... 358/400 |
| 5,448,376 | A | * | 9/1995 | Ohta ........................... 358/448 |
| 5,478,155 | A | * | 12/1995 | Sasaki .......................... 400/76 |
| 5,532,792 | A | * | 7/1996 | Hattori ....................... 355/206 |
| 5,535,009 | A | * | 7/1996 | Hansen ....................... 358/296 |
| 5,633,723 | A | * | 5/1997 | Sugiyama et al. .......... 358/296 |
| 5,684,934 | A | * | 11/1997 | Chen et al. ................. 395/113 |
| 5,689,765 | A | * | 11/1997 | Nishinozono ................ 399/81 |
| 5,706,037 | A | * | 1/1998 | McIntyre ....................... 347/3 |
| 5,706,412 | A | * | 1/1998 | Kojo .......................... 395/113 |
| 5,740,496 | A | * | 4/1998 | Kawabuchi et al. .......... 399/83 |
| 5,768,483 | A | * | 6/1998 | Maniwa et al. ............. 395/114 |
| 5,885,010 | A | * | 3/1999 | Kim ............................ 400/54 |
| 5,970,223 | A | * | 10/1999 | Debes et al. ................ 395/115 |

(Continued)

FOREIGN PATENT DOCUMENTS

JP          61-62071         3/1986

(Continued)

*Primary Examiner*—Twyler Lamb Haskins
*Assistant Examiner*—Yixing Qin
(74) *Attorney, Agent, or Firm*—Buchanan Ingersoll & Rooney PC

(57) ABSTRACT

An image forming apparatus includes a first memory for storing image data, a second memory for storing image forming conditions, an image output unit for outputting the image data stored in the first memory under the image forming conditions stored in the second memory, and command means for generating a command of discarding the image data being output from the image output unit. The apparatus also has a controller. If a command of discarding the image data is generated by the command means, the controller discards the image data stored in the first memory, while it maintains the associated image forming conditions stored in the second memory.

4 Claims, 13 Drawing Sheets

U.S. PATENT DOCUMENTS

| | | | |
|---|---|---|---|
| 6,137,588 A | * | 10/2000 | Deen et al. ............ 358/1.15 |
| 6,226,097 B1 | * | 5/2001 | Kimura ............... 358/1.14 |
| 6,894,792 B1 | * | 5/2005 | Abe .................. 358/1.15 |

FOREIGN PATENT DOCUMENTS

| | | |
|---|---|---|
| JP | 03-296072 | 12/1991 |
| JP | 4-305777 | 10/1992 |
| JP | 06-105104 | 4/1994 |
| JP | 09-027875 | 1/1997 |
| JP | 09-046490 | 2/1997 |
| JP | 9-163088 | 6/1997 |
| JP | 09-294194 | 11/1997 |

* cited by examiner

IMAGE FORMING APPARATUS

This application claims priority to Japanese Patent Application No. H10(1998)-16098 filed on Jan. 28, 1998, the disclosure of which is incorporated by reference in its entirety.

BACKGROUND OF THE INVENTION

1. Field of the Invention

This invention relates to an image forming apparatus.

2. Description of the Related Art

Japanese Unexamined Laid-open Patent Publication No. S61(1986)-62071 discloses an image forming apparatus which allows the user to select and input desired image modes (or image forming conditions), including the number of copies and the magnifications, for a plurality of original sets. This image forming apparatus has a memory for storing the selected image modes, and erasing means for deleting the old image modes stored in the memory.

Another type of known image forming apparatus stores selected image mode in association with the image data which is read from the original, and successively outputs the stored image data in the selected image made.

By the way, during the output of the image data, the user may wish to stop the output and discard the image data because some mistakes are found in the image data being output, or additional image data is required for the output data. In such a case, the conventional image forming apparatus discards both the image data being output, and the associated image mode. Accordingly, in order to re-scan the original and output the newly acquired image data, the user had to set the image mode again for the rescanned image data. The re-selection of the image mode is troublesome to the user.

SUMMARY OF THE INVENTION

Therefore, it is an object of the invention to provide an image forming apparatus which can maintain the image mode selected for specific image data even if that image data is discarded during the output and new image data is reread from the same original. It is another object of the invention to provide an image forming apparatus with an improved operability by preventing the step of setting the same image mode again for the newly acquired image data.

In order to achieve the object of the invention, an image forming apparatus includes a first memory for storing image data, a second memory for storing image forming conditions, an image output unit for output the image data stored in the first memory under the image forming conditions stored in the second memory, command means for generating a command of discarding the image data being output from the image output unit, and a controller for discarding the image data stored in the first memory when the command of discarding the image data is generated by the command means, while maintaining the associated image forming conditions stored in the second memory.

With this arrangement, only the undesirable image data is discarded, while the image mode (i.e., the image forming conditions) for the discarded image data is maintained in the memory. Accordingly, the user does not have to set the image mode again when rescanning the image data.

The image forming apparatus may further include an image input unit for inputting the image data to the first memory, and an output control means for causing the output unit to output image data newly input from the image input unit under the maintained image forming conditions.

The first memory can store a plurality of image data. In this case, the output control means gives priority to the newly inputted image data to be output under the maintained image forming conditions, over the rest of the image data stored in the first memory. Thus, if the user wishes to print another image under the same image mode, the new image is quickly printed before other print jobs in different modes are executed.

Preferably, the image forming apparatus has changing means for changing the maintained image forming conditions. In this case, the image data can be output under different image forming conditions.

The image input unit is, for example, an image reader which reads the image from the original and acquires the image data. When the image reader is reading another original, the command means generates a command of suspending the reading operation, and at the same time, it generates a command of discarding the image data being output. Alternatively, the command means generates a command of discarding the image data being output after the reading operation for another original has been completed.

BRIEF DESCRIPTION OF THE DRAWINGS

The above and other objects, features, and advantages of the invention will become more apparent from the following detailed description of the preferred embodiments, with reference to the attached drawings, wherein.

DETAILED DESCRIPTION OF THE PREFERRED EMBODIMENTS

The present invention will now be described in detail, with reference to the attached drawings, using a multi-job copying machine as a preferred example.

In this context, a "job" is a print job which is executed for a set of originals including one or more pages based on a print command.

A "multi-job function" enables a reading operation and an output operation to be executed independently of each other. In the reading operation, image data is read from the original, and stored in the image memory. In the output operation, the image data is read out of the image memory, and printed on a paper. The multi-job function allows a plurality of jobs to be registered for printing, and to be successively printed out in a prescribed order.

Figure 1:
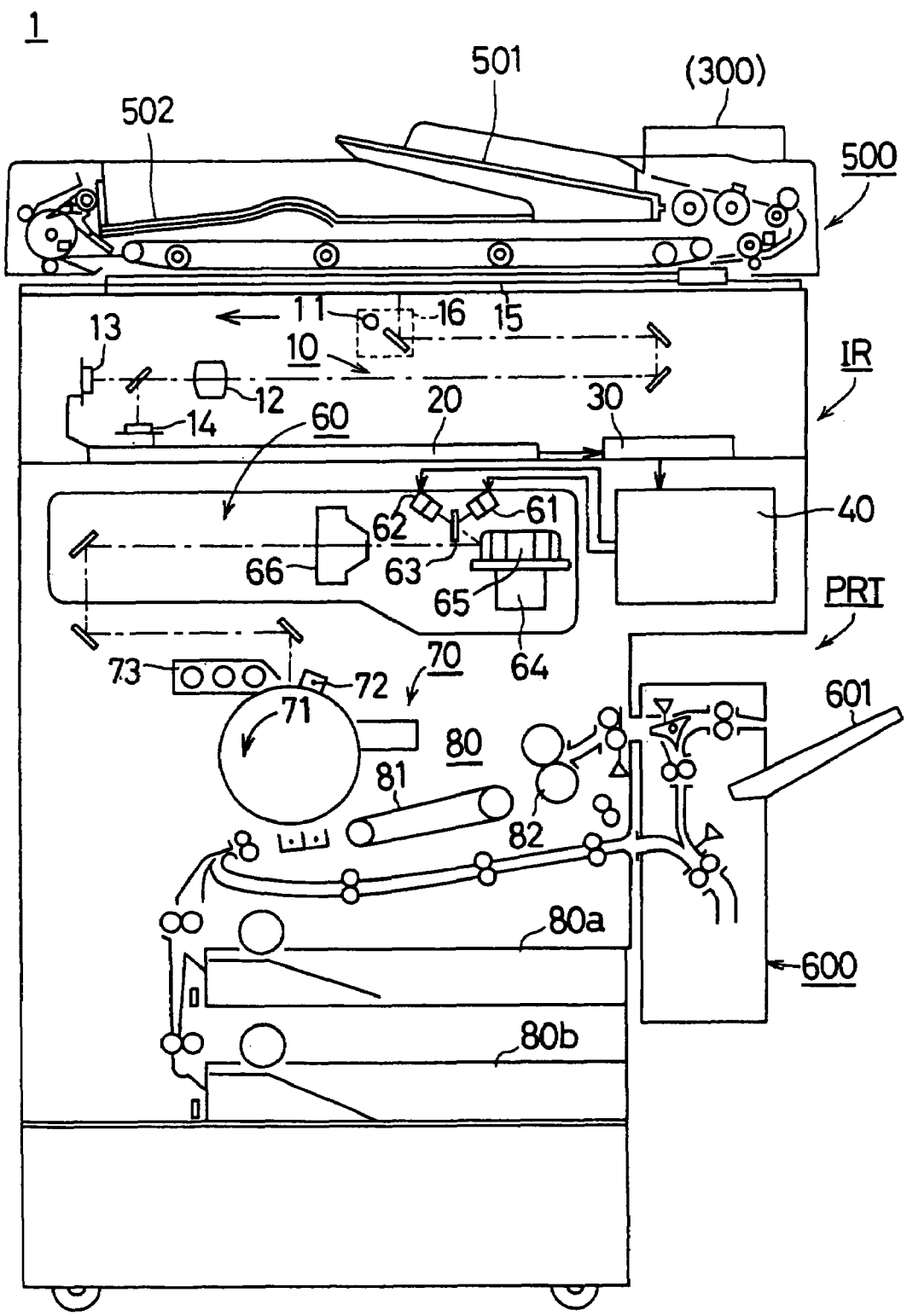
FIG. 1 is a schematic cross-sectional view of a copying machine 1 with a multi-job function according to an embodiment of the present invention.

FIG. 1 is a schematic cross-sectional view of a copying machine 1 having the multi-job function.

The copying machine 1 includes as major elements an image reader IR, a memory 30, a printer PRT, an operation panel 300, an original feeder 500, and paper resupply unit 600. The image reader IR reads the original, and creates image data. The memory 30 temporarily stores the image data generated by the image reader IR, together with the image mode selected for that image data. The printer PRT prints an image on a copy paper based on the image data and the image mode stored in the memory 30. The operation panel 300 is generally provided to the top face of the copying machine 1, and the user can input operation data through the operation panel 300. The original feeder 500 feeds the original and turns the original over if necessary. The paper resupply unit 600 inverts a copy paper, on one side of which an image was already recorded, and supplies the inverted copy paper to the printer PRT for another image formation on the other side of the paper.

Figure 2:
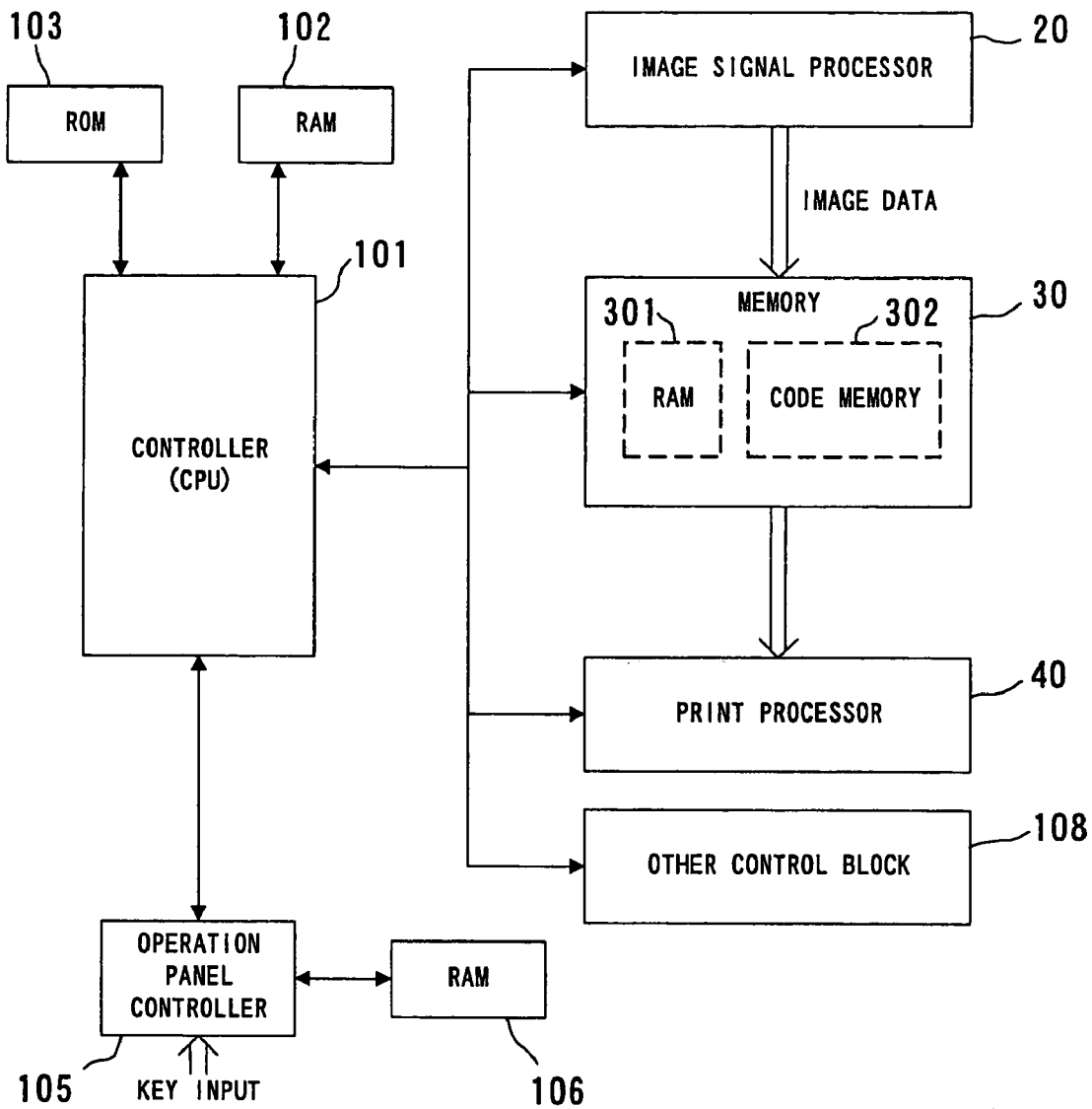
FIG. 2 is a block diagram of the control block of the copying machine 1 shown in FIG. 1.

These operations are controlled by a controller, which includes a ROM 103 storing operation programs for the copying machine 1, a CPU 101 for executing the programs, and a RAM 102 storing information required for the execution of the programs, as shown in FIG. 2.

If a set of original is placed on the tray 501, which is generally provided to the top cover of the copying machine 1, the feeder 500 successively feeds the originals to the reading position on a glass stage 15 from the lower-most page, in response to a print command. After the image reader IR reads the original, the original is ejected to the ejection tray 502.

The image reader IR includes a scan system 10 and an image signal processor 20. In the scan system 10, the original placed at the reading position is exposed to the exposure lamp 11 fixed to the scanner 16 which moves below the glass stage 15. The reflected light from the original is guided to the photoelectric converters 13 and 14 via the reflecting mirror and the collective lens 12. The photoelectric converters 13 and 14 include, for example, CCD arrays, and generated electric signals. The electric signals generated by the scan system 10 are supplied to the image signal processor 20, in which the signals are subjected to image processing, such as binarization, image correction, enlargement or reduction, image editing.

The processed image data is then stored in the memory 30.

The printer PRT includes a print processor 40, an optical system 60, an imaging system 70, and a paper transporting system 80. The print processor 40 drives the optical system 60 based on the image data and the image mode supplied from the memory 30. In the optical system 60, semiconductor lasers 61 and 62 generate laser beams based on the signals controlled by the print processor 40. These laser beams are combined into a single beam by a dichroic mirror 63, reflected by a polygon mirror 65 which is rotated by a motor 64, and guided to a photosensitive drum 71 of the imaging system 70 via a main lens 66.

In the imaging system 70, the photosensitive drum 71 has been electrically charged by a charger 72 in advance. The laser beam guided from the optical system 60 irradiates the charged drum 71, whereby a electrostatic latent image is formed on the photosensitive drum 71. A developer 73 forms a toner image on the electrostatic latent image. The toner image on the photosensitive drum 71 is transferred onto the copy paper which was supplied from the paper-supply cassette 80*a* or 80*b* of the paper transporting system 80. The copy paper which bears the toner image is carried by the transporting belt 81 to fixing rollers 82, by which the toner image is thermally fixed to the copy paper with a pressure.

Finally, the copy paper is ejected to the tray 601 of the paper resupply unit 600.

In both the original feeder 500 and the printer PRT of the copying machine 1, paper jam is detected. Furthermore, the printer PRT detects an error due to out of paper in the paper-supply cassette, and the original feeder 500 detects an error due to misalignment of the original at the reading position. If the copying machine stops its operation due to a fault or a breakdown, such a fault can also be detected.

FIG. 2 is a control block diagram of the copying machine 1.

A controller 101 controls the overall operations of the copying machine 1 according to the programs stored in a ROM 103. The controller 101 is connected to a memory 30 includes a RAM 301, in which a job management table is stored, and a code memory 302, in which encoded image data for each job is stored. The controller 101 is also connected to an operation panel controller 105 which controls the operation panel 300 (FIG. 1). In particular, the operation panel controller 105 controls the display of the operation panel, while communicating with the controller 101, and it supplies data input through the operation panel 300 to the controller 101.

An RAM 106 stores display data, that is, all the sequences of the display screen based on the operation mode information and the conditions of the copying machine 1.

The image data read by the image reader IR is processed and encoded by the signal processor 20, and the processed data is stored in the code memory in the memory 30. The stored image data is supplied to the print processor 40 in a prescribed order for the printing operation.

Figure 3:
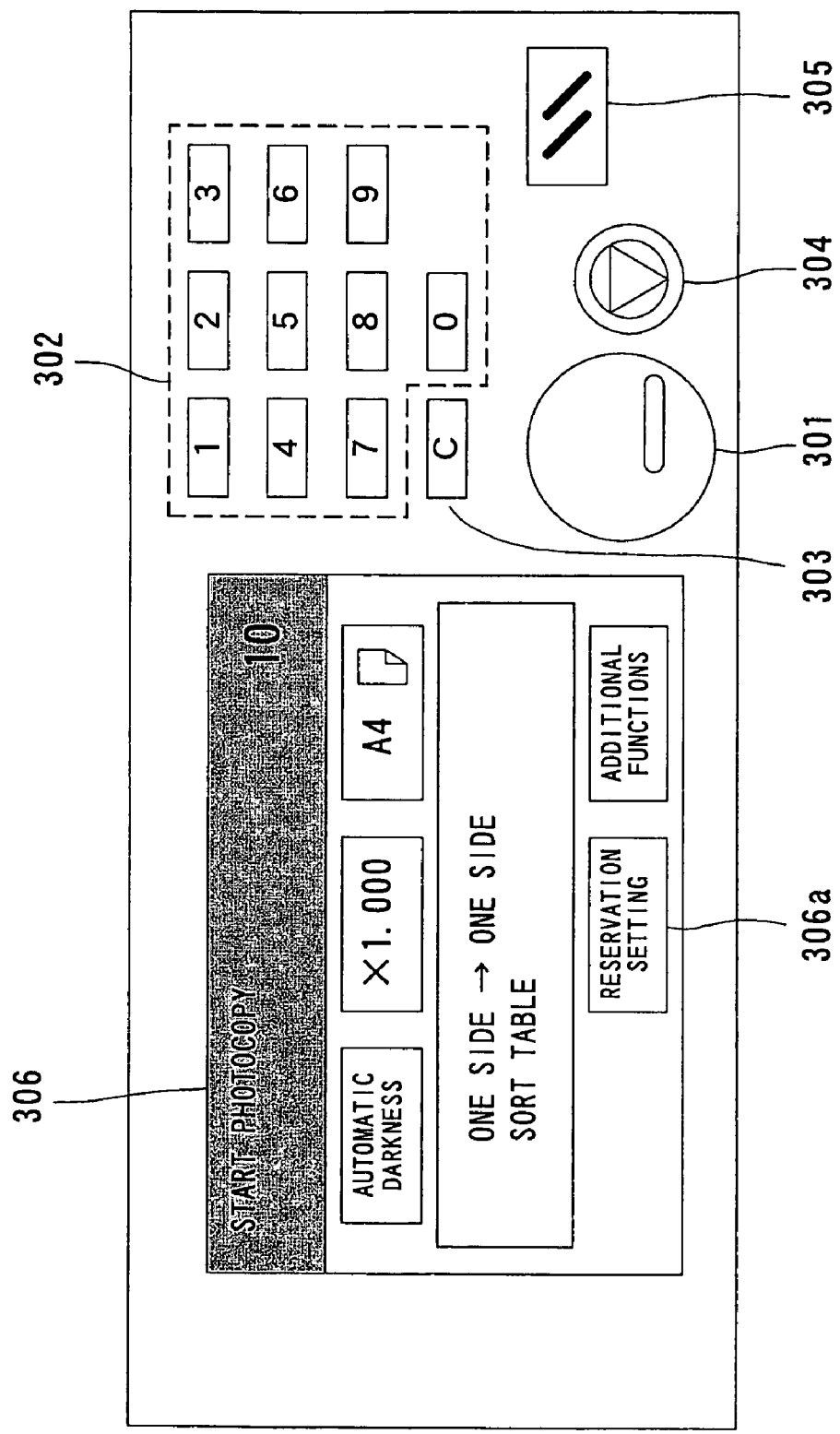
FIG. 3 is a plan view of the operation panel 300 of the copying machine 1.

FIG. 3 is a plan view of the operation panel 300 of the copying machine 1. A start key 301 is pressed to start a copy operation. A ten-key keyboard 302 receives any numerical inputs, such as the number of copies. A clear key 303 is pressed to clear the numerical value input through the ten key, and to discard the image data in the image memory 30. A stop key 304 is pressed to stop the copy operation and/or the scan operation. A panel reset key 305 is pressed to discard the currently selected image mode and the job.

A touch panel is installed in the top face of an LCD 306. The user can select and set various parameters according to the instructions displayed on the LCD 306. For example, if a reservation setting key 306*a* is displayed on the LCD 306, the user can book a print job by simply touching the reservation setting key 306*a*. The magnification of copy or other image modes can also be set through the touch panel.

If an image mode call key is displayed on the LCD, the user can read out the image mode, which has already been set, and can change this image mode.

With the copying machine 1 according to the embodiment, the image data read from the original is temporarily stored in the memory, and the image data is read out of the memory for output (printing). Accordingly, even if the previous job (for a set of pages) is still in printing, the next set of originals can be scanned as the next job as long as all of pages of the previous job have been read. Thus, one or more print jobs can be stored and booked in the memory. The next set of originals is scanned by pressing the start key 301 even during the printing of the previous job. After the scanning, desired copy modes are selected, and then, this job is registered as the next job by pressing the reservation setting key 306a. The scanned image data is stored together with the copy modes (e.g., the number of copies, the magnification, the paper size, etc.) for the registered job. If the previous job is finished, the current print job is automatically executed.

Figure 4:
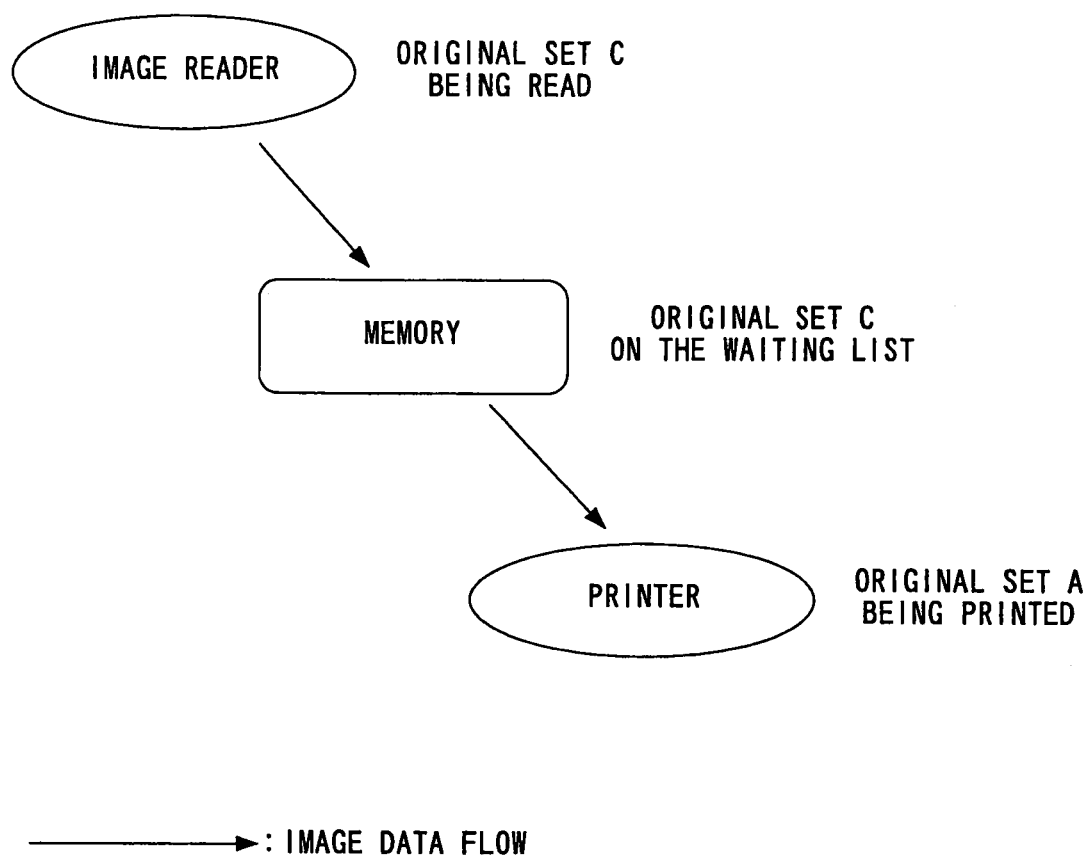
FIG. 4 illustrates the multi-job operation of the copying machine 1.

FIG. 4 illustrates a data flow of multiple print jobs in the copying machine 1. There are two major processes in the sequence of copy operation, that is, a process for scanning the original and generating and storing image data, and a process for printing the stored image data. These two major processes are performed independently of each other, and one or more print jobs can be registered on a waiting list in the memory 30. Copies of a set of originals are obtained through a series of processing described above.

The multi-job function of the copying machine 1 allows original set C to be scanned by the image reader IR during the output of the original set A from the printer PRT. At this time, the image data of original set B, which has already been scanned before the original set C, is stored in the memory 30. Thus, the multi-job function allows the printing operation and the scanning operation to be performed independently.

Because of the independent operations, even if a trouble or an error occurred in either the printing or scanning operation, the other operation is continuously performed without being disturbed.

Figure 5:
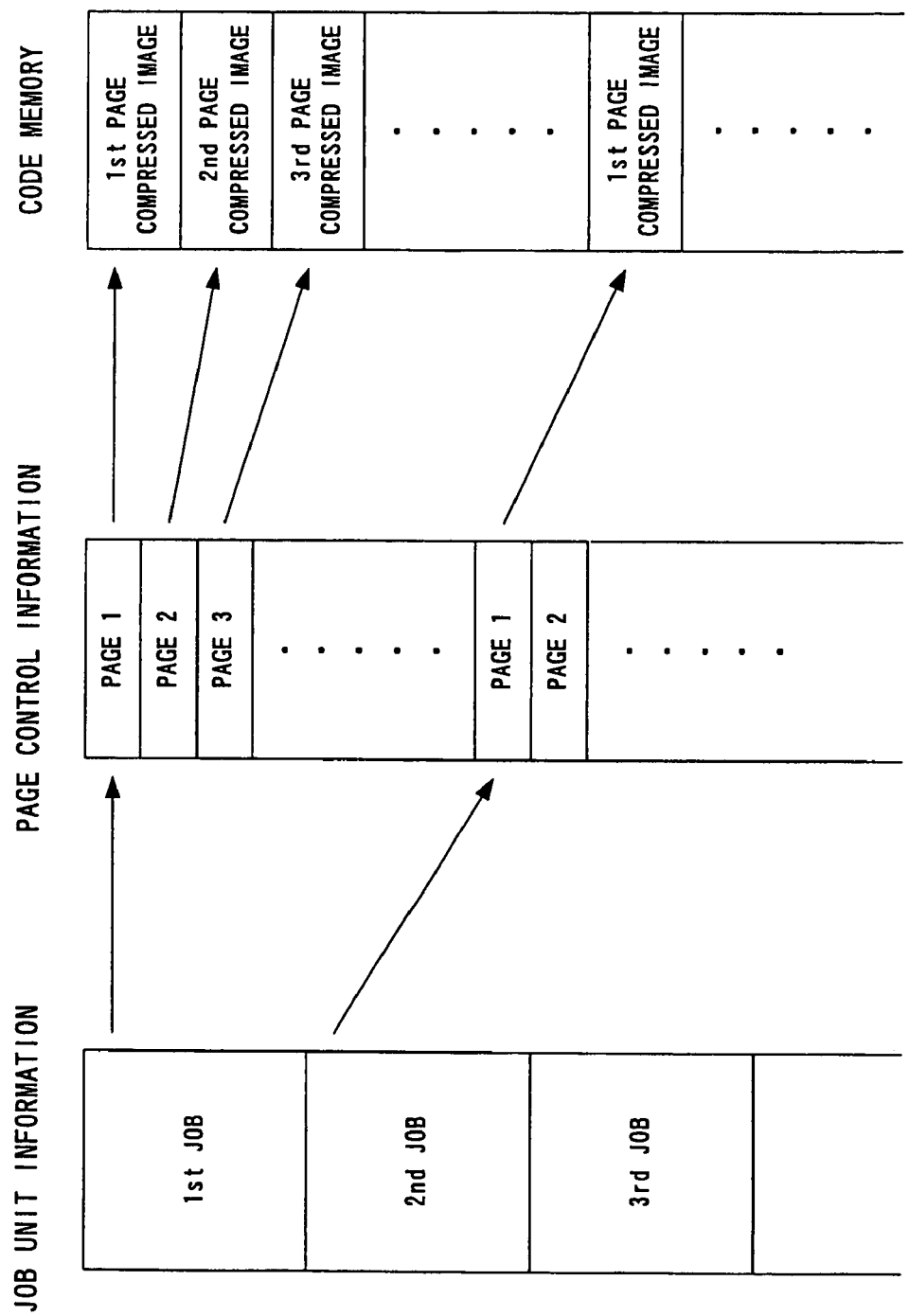
FIG. 5 illustrates the management table for managing the registered jobs, and the code memory in the image memory 300.

FIG. 5 illustrates the management table (consisting of a job-unit information table T-1 and a page management information table T-2) for managing the registered print jobs, together with the encoded data stored in the code memory in the image memory 30. When reading the original and compressing the data, the image information must be managed for each unit job, and the job-unit information is divided and stored for each unit page. Accordingly, the management table includes the job-unit information table T-1 for storing information per unit job, and the page management information table T-2 for storing information per unit page.

The job-unit information table T-1 stores the entry number of each job, all the addresses of page management information, operation mode such as the numbers of copies, magnifications, a two-sided copy mode, etc. The page management information table T-2 stored compressed (or encoded) image data for each page with an associated address.

The information in the management table and the encoded image data in the code memory are erased when these information were correctly read out, and the selected number of copies were printed.

Figure 6:
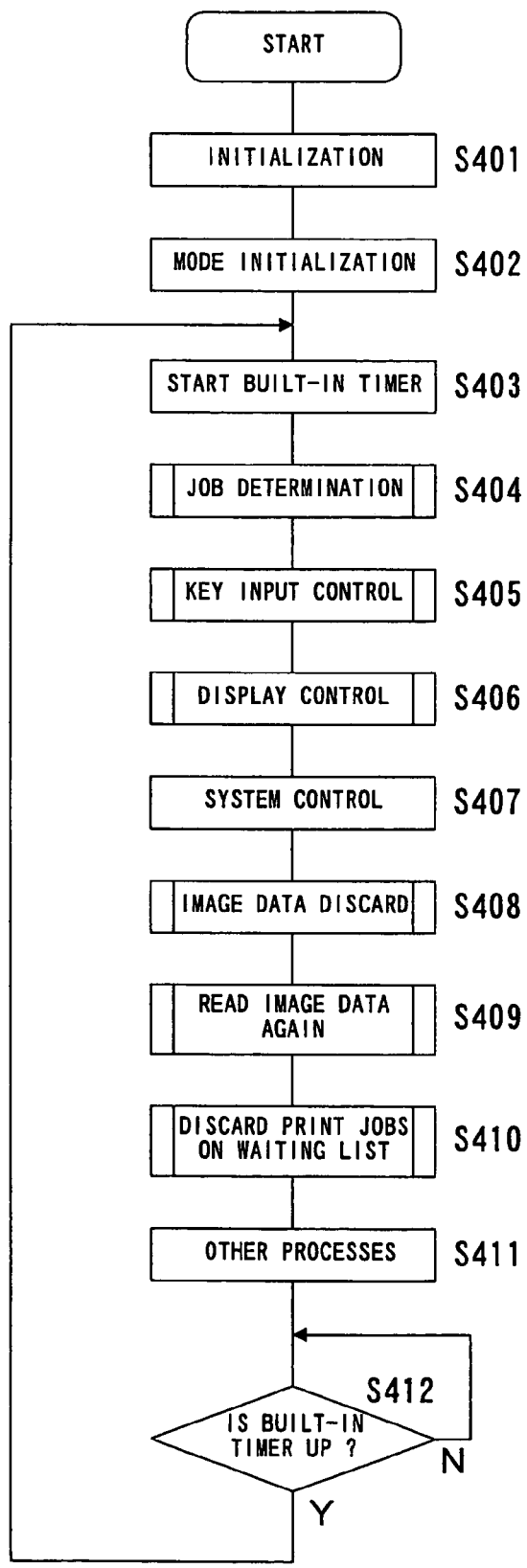
FIG. 6 is a flowchart of the main routine executed by the CPU which controls the overall operations of the copying machine 1.

FIG. 6 is a flowchart of the main routine executed by the CPU which controls the overall operations of the copying machine 1.

When the copying machine 1 is powered on, and the CPU is reset, the program starts. First, in Step S401 (hereinafter simply referred to as 'S401' or the like), the CPU is initialized by clearing the RAM and setting up the registers. The modes of the copying machine 1 is also initialized in S402.

In S403, the built-in timer, which is installed in the CPU, is started. The built in timer defines the time length of a routine, and its value is set in advance during the initial setting.

In S404, the state of the current job is determined. This step is referred to as job determination. In S405, key inputs through the hard keys and the touch panel are controlled (i.e., Key input control). In S406, displays on the LCD and LED are controlled (i.e., display control). The steps S404 through 406 have sub-routines, which will be described in more detail below.

In S407, the ordinary system operations of the copying machine 1 is controlled (i.e., system control).

In S408, the image data which is being output is discarded if a command of discarding the current image data is generated. After the discard of the image data, another image data is scanned by the image reader IR in S409. If a command of discarding a waiting print job is generated, the waiting job is discarded in S410. Other processes are executed in S411. The steps S408 through S410 also have sub-routines, the details of which will be described later.

After the steps S403 through S411 have been executed, it is determined in S412 if the built-in timer which was set in S403 is up. If the timer is up (i.e., YES in S412), one routine is finished, and the process returns to S403. If the built-in timer has not been up (i.e., NO in S412), the process stays at S412 until the timer is up.

Figure 7:
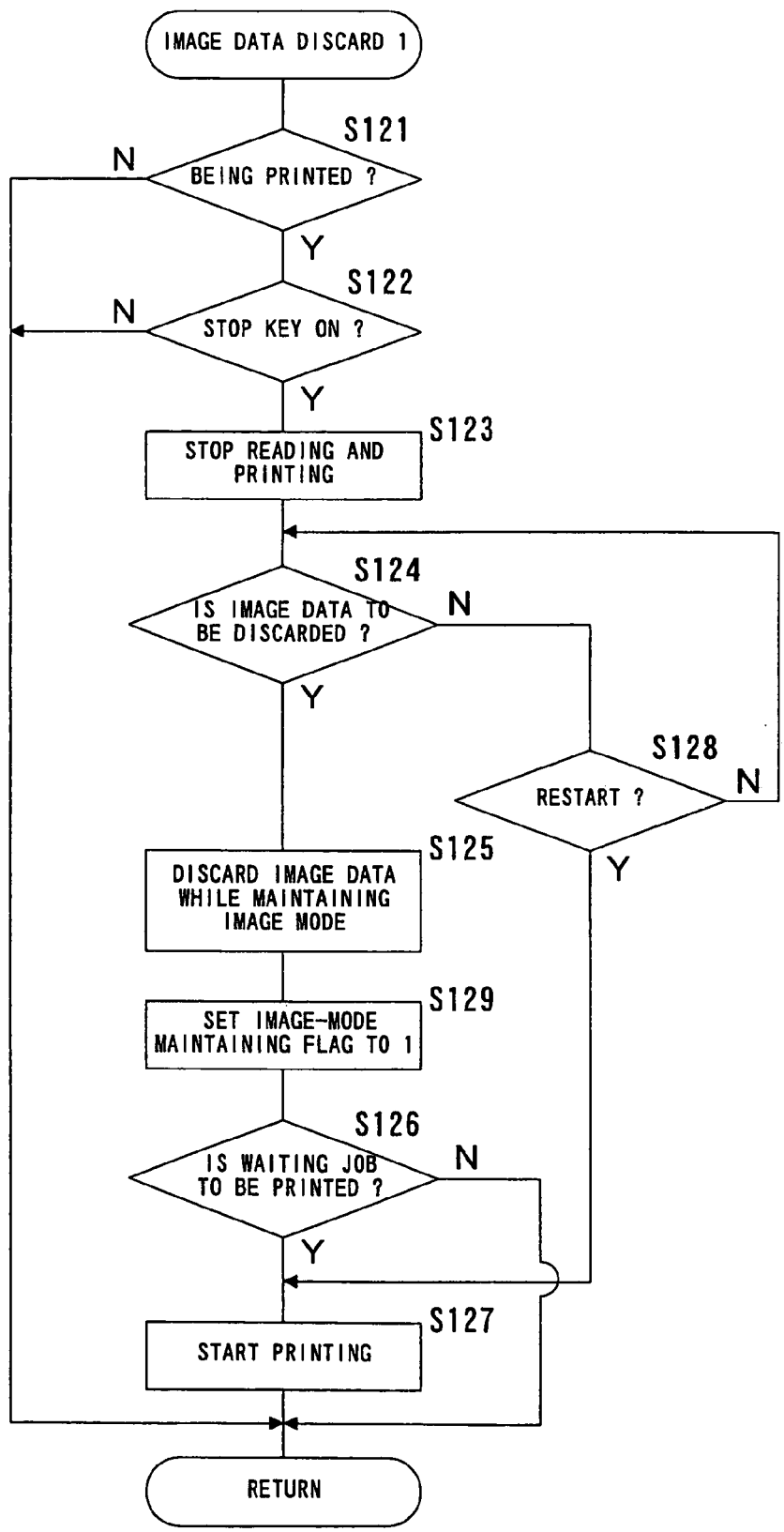
FIG. 7 is a flowchart of the sub-routine of the image data discard process (Step S408) shown in FIG. 6.

FIG. 7 is a flowchart of the sub-routine of the discard of the current image data (S408) shown in FIG. 6. In this example, if another image data is being read by the image reader IR when a command of discarding the currently printed data is generated, the reading operation is interrupted in order to discard the currently output image data.

First, in S121, it is determined if the copying machine 1 is printing. If the copying machine 1 is outputting image data (YES in S121), then it is determined in S122 if the stop key 304 has been pressed to stop the printing operation of the copying machine 1. If the stop key 304 has been pressed (YES in S122), the reading operation and the printing operation are stopped in S123. At this time, the display on the LCD panel 306 is G152 shown in FIG. 10. If the copying machine 1 is not currently printing (NO in S121), or if the stop key 304 has not been pressed (NO in S122) even if the copying machine 1 is printing, then this routine returns.

Figure 10:
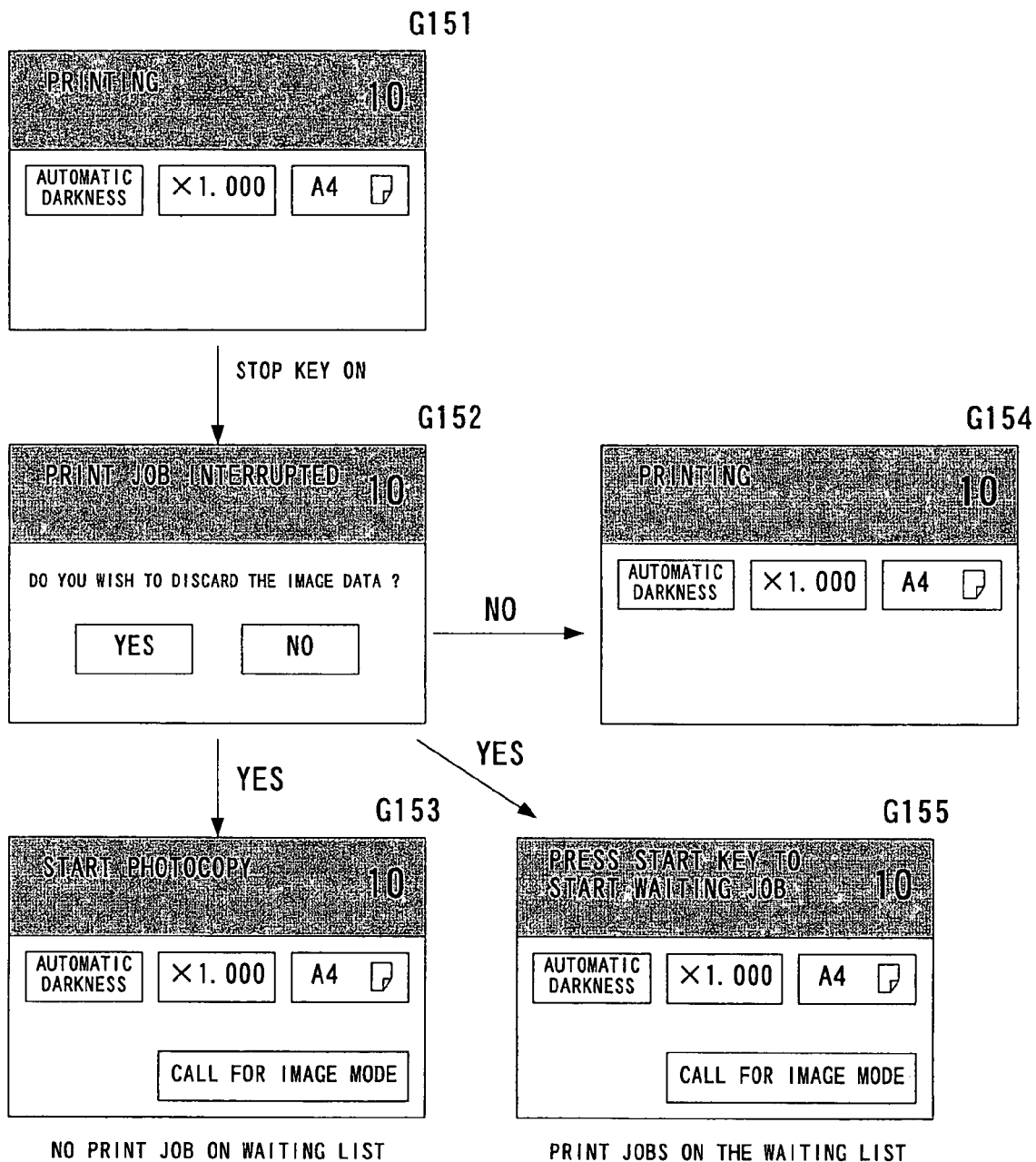
FIG. 10 illustrates examples of the liquid crystal display when the image data is discarded.

Then, it is determined in S124 if the current image data should be discarded, that is, it is determined if the "YES" key displayed in the panel G152 in FIG. 10 has been pressed. If the image data is to be discarded (YES in S124), only the image data of the interrupted print job is discarded, and the image mode selected for that image data is maintained (S125). Thus, the current image data is erased from the memory 30, while maintaining the stored image mode. At this time, the image mode maintaining flag, which indicates the maintenance of the image mode, is set (S129). Then, it is determined in S126 if a waiting job is to be printed. If there is a job on the waiting list, and if the start key 301 has been pressed, it is regarded that the waiting job is to be printed. In this case (i.e., YES in S126), the printing operation is started in S127, and this routine returns. If the waiting job is not to be printed (i.e., NO in S126), this routine returns.

If the current image data should not be discarded (NO in S124) after the reading operation and the printing operation were suspended in S123, it is determined in S128 if the interrupted printing operation is to be restarted. If the "NO" key is pressed on the panel display G152 in FIG. 10 (i.e., YES in S128), the process proceeds to S127, in which the printing operation is restarted. If the interrupted print job does not have to be restarted (NO in S128), the process returns to S124.

Figure 8:
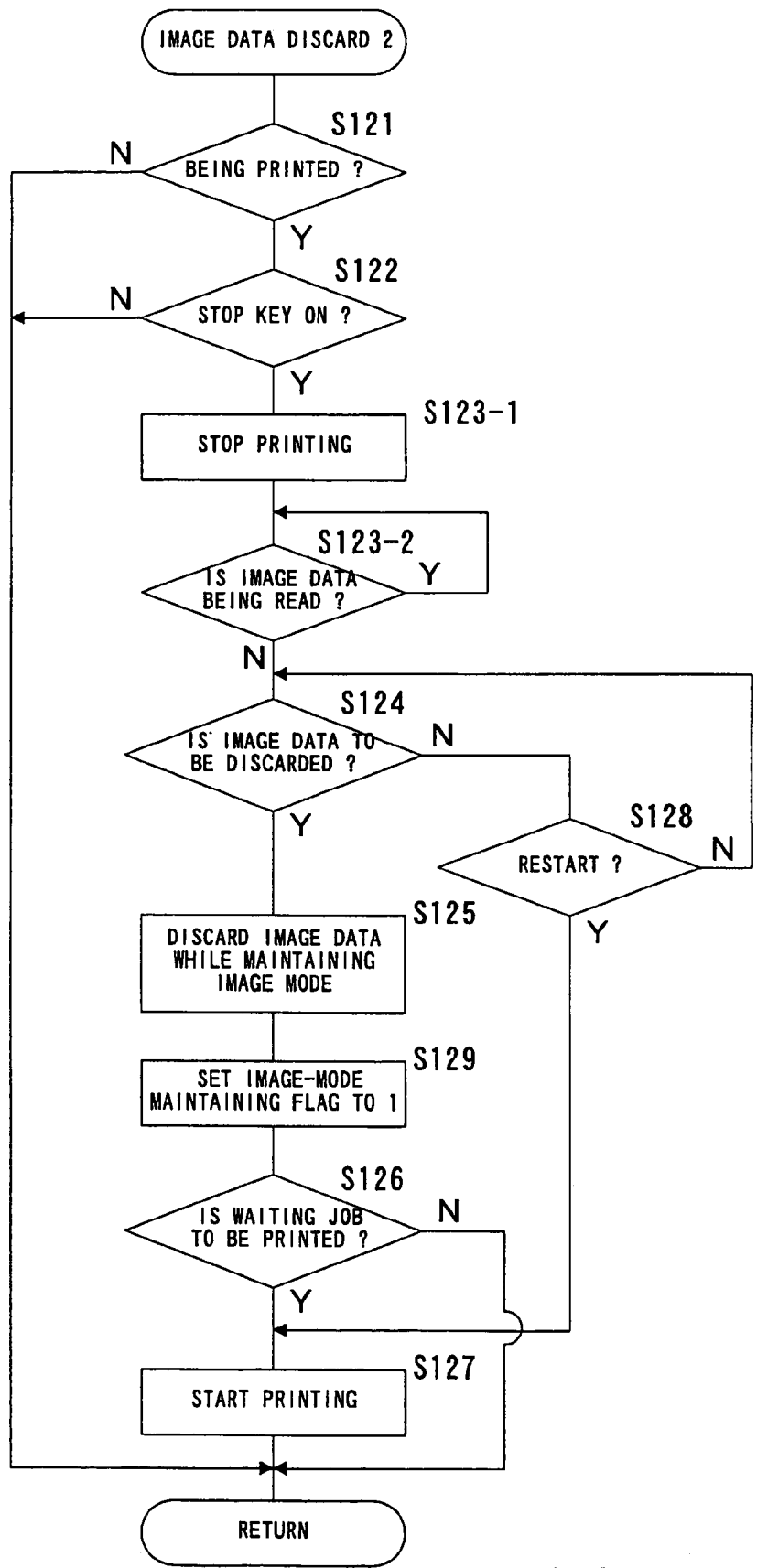
FIG. 8 is a flowchart of a modified sub-routine of the image data discard process (Step S408) shown in FIG. 6.

FIG. 8 shows another example of the sub-routine of the discard of image data (S408) shown in FIG. 4. In this modification, if another image data is being read by the image reader IR when a command of discarding the currently printed data is generated, the reading operation is completed first, and then, the currently output image data is discarded.

Unlike the flowchart shown in FIG. 7, if the stop key 304 is ON (YES in S122) in FIG. 8, only the printing operation is interrupted in S123-1, and the reading operation is continued until it is completed in S123-2. This point is different from the flowchart of FIG. 7, in which both the reading operation and the printing operation is stopped in S123. To be more precise, after the printing operation is stopped in S123-1, it is determined in S123-2 if other image data is being scanned. If other image data is being read by the image reader IR (YES in S123-2), this step is repeated until the reading operation is completed. If image data is not being scanned (NO in S123-2), the process proceeds to S124, in which it is determined if the interrupted image data is to be discarded.

Other steps in FIG. 8 are the same as those shown in FIG. 7, where the same steps are indicated by the same step numbers, and the explanation for them will be omitted.

Figure 9:
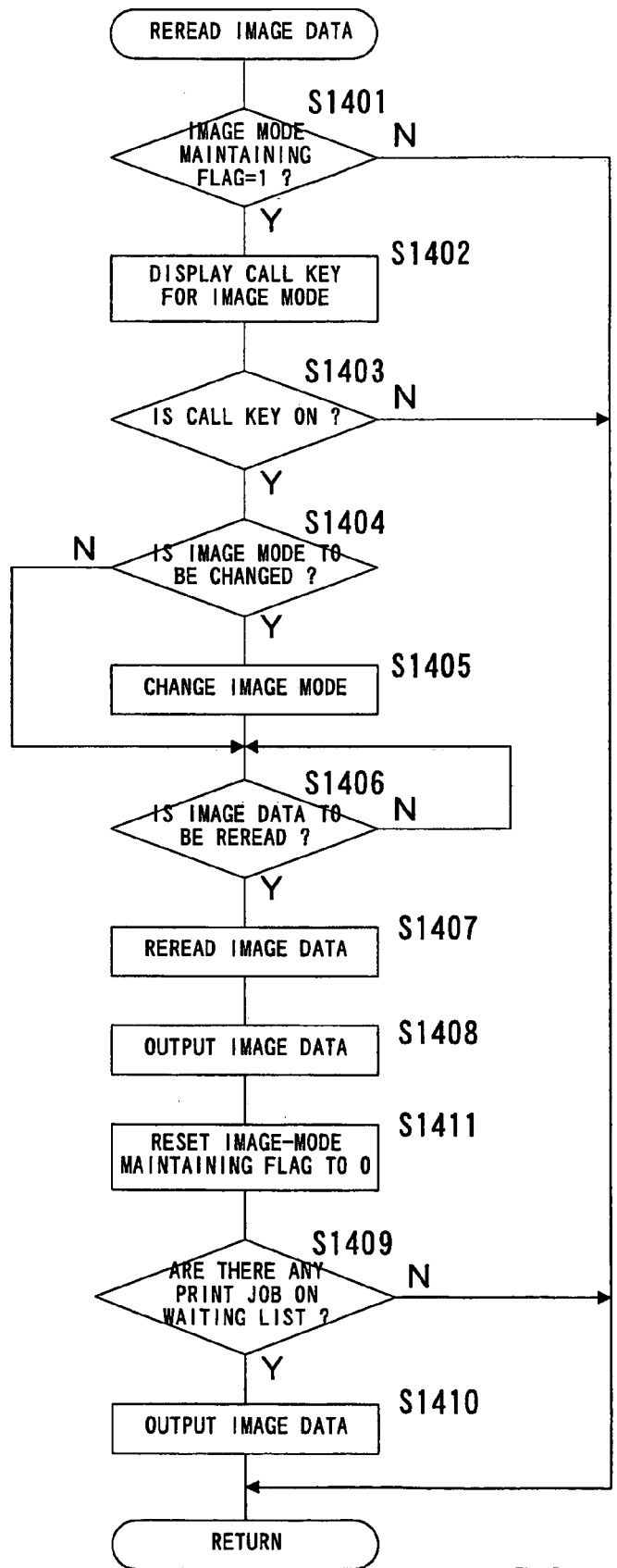
FIG. 9 is a flowchart of the sub-routine of the rereading of image data (Step S409) shown in FIG. 6.

FIG. 9 is a flowchart of the sub-routine of rereading image data (S409) shown in FIG. 6.

First, in S1401, it is determined if the image mode previously selected for the discarded image data is maintained, based on the value of the image mode maintaining flag. If the image mode is maintained (YES in S1401), the call key for reading out the maintained image mode is displayed on the LCD panel 306, as shown in G153 and G155 in FIG. 10, in S1402. If the previously selected image mode is not maintained (NO in S1401), this routine returns.

In S1403, it is determined if the call key for the image mode has been pressed. If the call key has been pressed (YES in S1403), the called image mode is displayed on the LCD panel, and it is determined in S1404 if the image mode is to be changed. If the image mode is to be changed (YES in S1404), the previously selected image mode is changed through the key operation in S1405. Then, in S1406, it is determined if the original is to be rescanned. If the previously selected image mode is not changed (NO in S1404), the process directly proceeds to S1406, and the image data is reread from the same original.

In S1406, if the original is placed again in the feed tray, and the print key has been pressed, it is regarded that the image data is reread (YES in S1406). In this case, the image reader IR scans the original and acquires the image data again in S1407, and the newly scanned image data is output in the previously selected image mode, or in the changed image mode in S1408. If the image data is not rescanned (NO in S1406), the process stays in this step until the print key has been pressed.

After the image data is output, the image mode maintaining flag is reset in S1411, and in S1409, it is determined if there are any print jobs on the waiting list. If there are waiting print jobs (YES in S1409), these jobs are executed in S1410, and this routine returns. If there is no waiting print job (NO in S1409), this routine also returns.

In this manner, priority is given to rereading of image data over the waiting print jobs.

FIG. 10 illustrates examples of the display sequence on the LCD panel when the currently printed image data is discarded. G151 indicates the printing operation is going on.

If the stop key 304 is pressed, the LCD panel changes to G152 in order to indicate that the printing operation is interrupted. This screen also displays YES and NO buttons to allow the user to select discarding or not discarding the image data. If the image data is discarded, and if no print job is on the waiting list, the LCD panel changes to G153, which displays an image mode call key. If the image data is discarded, and if there are print jobs on the waiting list, the LCD panel changes to G155 which exhibits the message for allowing the user to start the waiting job. If the image data is not discarded in the display G152, the LCD panel changes to G154, which indicates that the output operation is continued.

Figure 11:
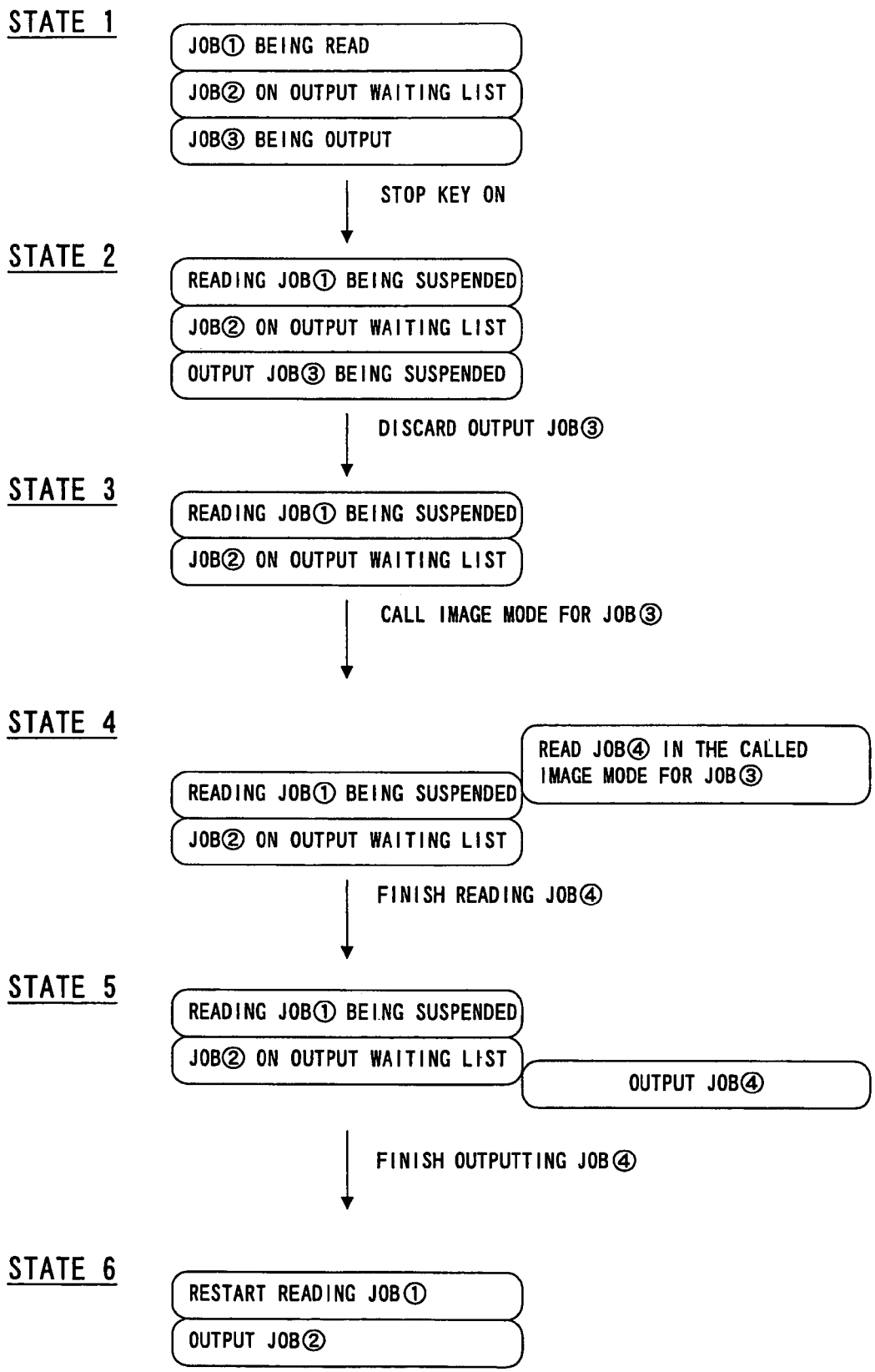
FIG. 11 schematically illustrates an example of the operation flow from the discard of the image data to the completion of the output of new image data.

FIG. 11 illustrates a sequence of operation states from the discard of the image data to the output of the waiting job.

In state 1, job (1) is being scanned, job (2) is on the output waiting list, and job (3) is being output. If the stop key 304 is pressed, the state transits to State 2, in which job (1) and job (3) are interrupted. If job (3) is discarded, the state transits to State 3. The image mode selected for job (3) is called, and the image data is scanned again from the same original as reading job (4) (State 4). In State 4, job (1) is interrupted, job (2) is on the output waiting list, and job (4) is executed first. When the image data is reread in job (4), the rescanned image data is output with priority over job (2) (State 5). When the output operation of job (4) is completed, the waiting job (2) is executed, and the interrupted reading job (1) is restarted (State 6).

Figure 12:
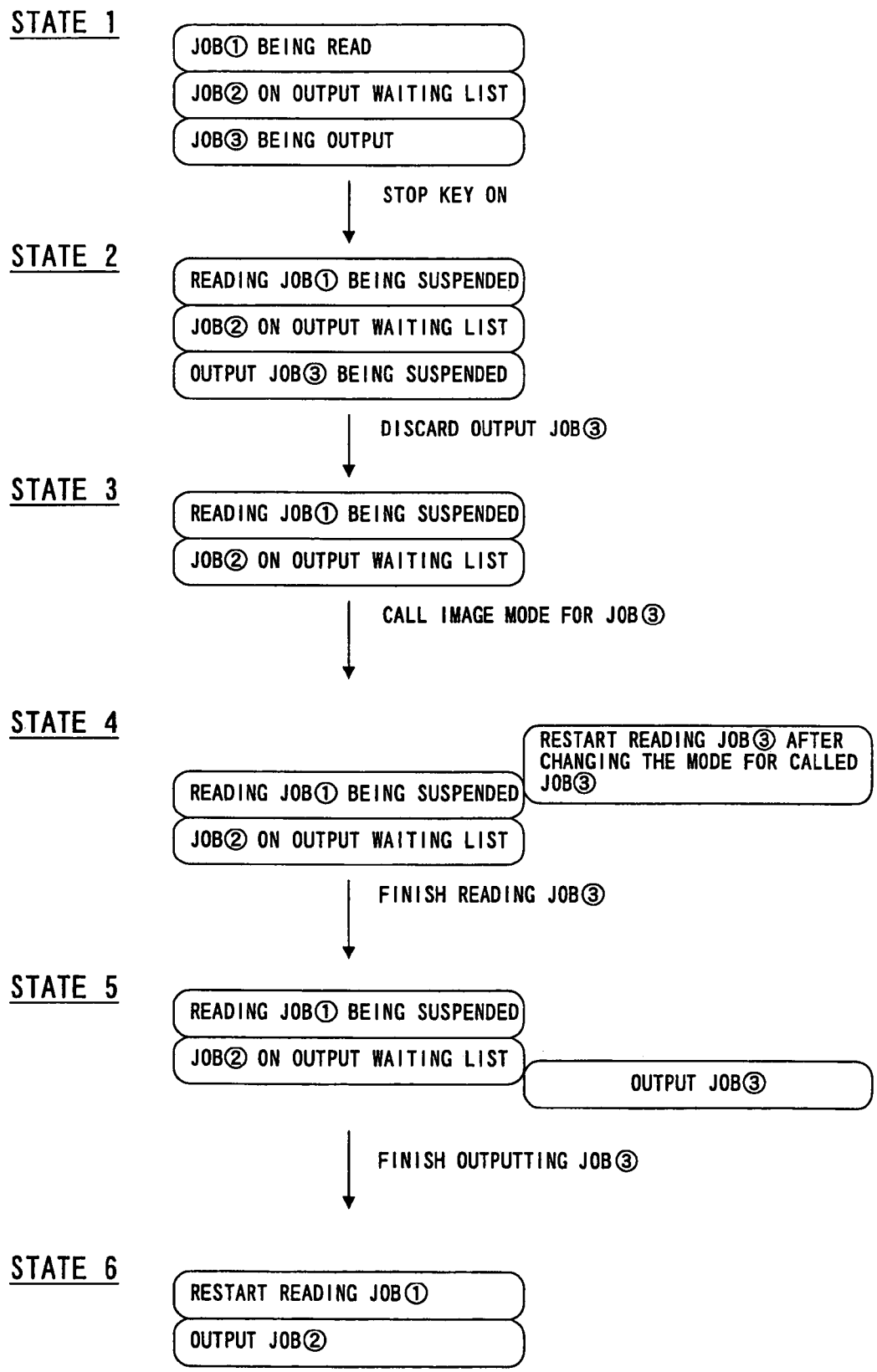
FIG. 12 schematically illustrates another example of the operation flow from the discard of the image data to the completion of the output of new image data.

FIG. 12 illustrates another example of the sequence of operation states from the discard of the image data to the output of the waiting job.

In state 1, job (1) is being scanned, job (2) is on the output waiting list, and job (3) is being output. If the stop key 304 is pressed, the state transits to State 2, in which job (1) and job (3) are interrupted. If job (3) is discarded, the state transits to State 3. The image mode selected for job (3) is called, and that image mode is changed. After the image mode was changed, the image data is scanned again from the same original as the same job (3) (State 4). In State 4, job (1) is interrupted, job (2) is on the output waiting list, and job (3) is executed first. When the image data is reread in job (3), the rescanned image data is output with priority over job (2) (State 5). When the output operation of job (3) is completed, the waiting job (2) is executed, and the interrupted reading job (1) is restarted (State 6).

Figure 13:
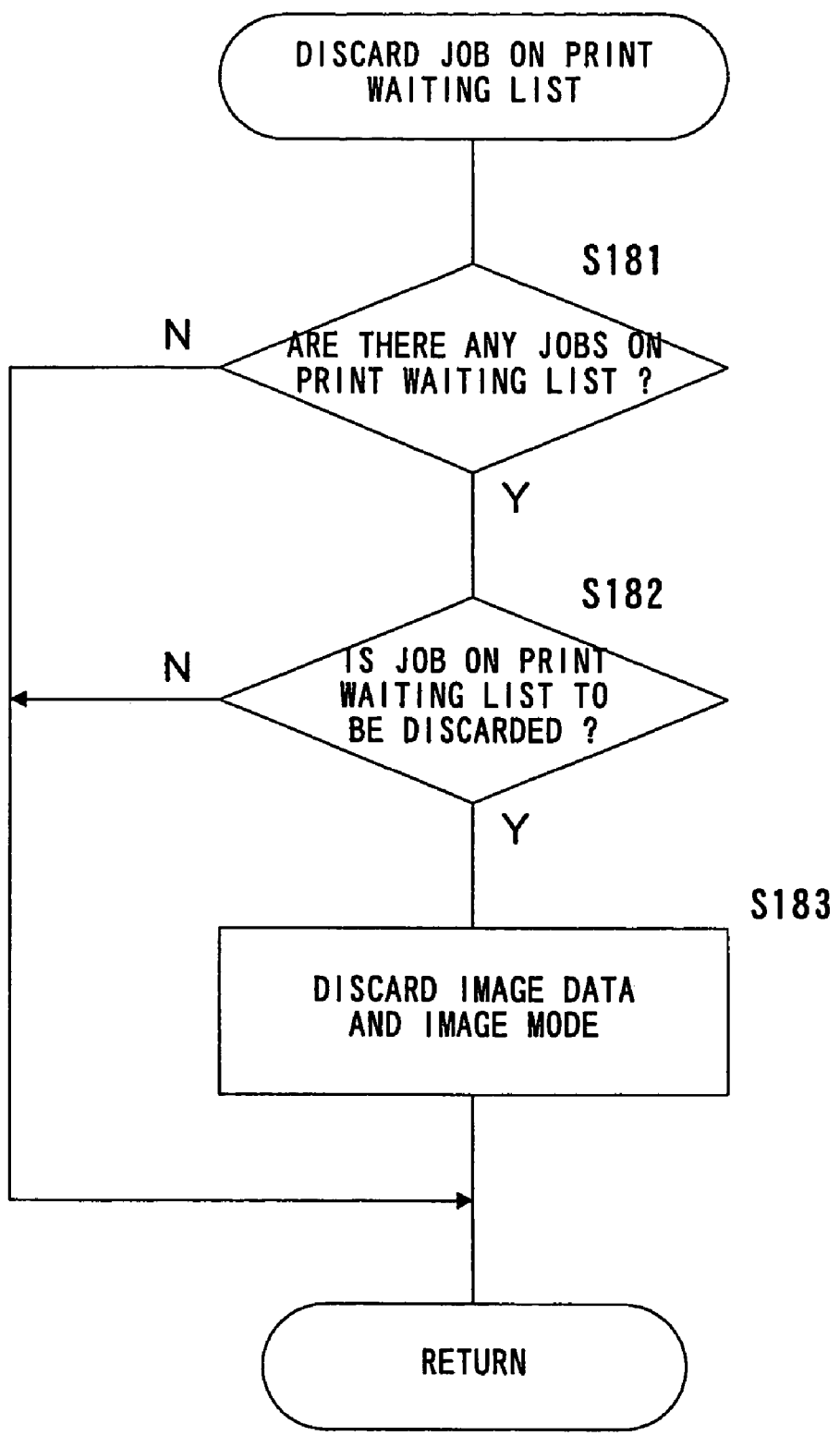
FIG. 13 is a flowchart of the sub-routine of the waiting job discard process (Step S410) shown in FIG. 6.

FIG. 13 is a flowchart of the sub-routine of the discard of a print-waiting job (S410) shown in FIG. 6.

First, it is determined in S181 if there are any jobs on the print waiting list. If there are waiting jobs (YES in S181), it is determined for each waiting job if the waiting job is to be discarded in S182. If a waiting job is selected and determined to be discarded (YES in S182), both the image data and the image mode for that job are discarded in S183, and this routine returns. In this example, the waiting list is displayed on the LCD panel, and the user selects jobs that should be discarded, and presses the clear key 303 to discard the selected jobs. If there is no waiting job (NO in S181), or if none of the waiting jobs is discarded (NO in S182), this routine also returns.

Although the image forming apparatus having a multi-job function which allows the reading means and the output means to operate independently each other has been described as the preferred embodiment, the invention can also be applied to image forming apparatuses without the multi-job function. In this case, the image mode selected for the currently output data is maintained even if the image data is discarded. In the embodiment, the image reader IR is used as an input unit for the original. However, externally connected computers or facsimile machines can also be used as input units.

The terms and expressions which have been employed herein are used as terms of description and not of limitation, and there is no intent, in the use of such terms and expressions, of excluding any of the equivalents of the features shown and it described or portions thereof, but it is recognized that various modifications are possible within the scope of the invention claimed.

What is claimed is:

1. An image forming apparatus, comprising:
   an image reader for reading an original and acquiring image data of the original;
   an image memory for storing the image data acquired by the image reader;
   a mode memory for storing image forming conditions selected for the acquired image data, said image forming conditions being at least one of: number of copies, and magnification;
   a printer for printing an image on a paper, based on the image data stored in the image memory, under the image forming conditions stored in the mode memory;
   a command unit for generating a command of discarding the image data being printed by the printer;
   an image data discarding controller for discarding the image data stored in the image memory when the command of discarding the image data is generated by the command unit, while maintaining the associated image forming conditions stored in the mode memory;
   a print control unit for causing the printer to print another image data newly read by the image reader after the discarding of image data from the image memory under the maintained image forming conditions in the mode memory; and
   a job stopping controller for stopping a print operation of a job being printed by the printer;
   wherein the command unit generates a command of discarding image data of the job stopped by the job stopping controller; and
   wherein the image data discarding controller discards the image data of the job stopped by the job stopping controller and maintains the image forming conditions of the job;
   wherein the image reader and the printer operate independently, and the image memory stores image data for a plurality of jobs; and
   wherein the print control means unit give priority to a new job for printing under the maintained forming conditions over the rest of the jobs on a waiting list.

2. An image forming apparatus, comprising:
   a first memory for storing image data;
   a second memory for storing image forming conditions, said image forming conditions being at least one of: number of copies, and magnification;
   an image output unit for printing image data stored in a first memory under the image forming conditions stored in the second memory;
   a command unit for generating a command of discarding the image data being printed from the image output unit;
   an image data discarding controller for discarding the image data stored in the first memory when the command of discarding the image data is generated by the command unit, while maintaining the associated image forming conditions stored in the second memory;
   a job stopping controller for stopping a print operation of a job being printed by the image output unit;
   wherein the command unit generates a command of discarding the image data of the job stopped by the job stopping controller; and
   wherein the image data discarding controller discards the image data of the job stopped by the job stopping controller and maintains the image forming conditions of the job;
   an image input unit for inputting image data to the first memory; and
   an output control unit for causing the output unit to output image data newly input from the image input unit after the discarding of image data from the first memory under the maintained image forming conditions;
   wherein the first memory stores a plurality of image data, and the output control unit gives priority to the newly inputted image data to be printed under the maintained image forming conditions over the rest of the image data.

3. The image forming apparatus of claim 1, wherein storing image forming conditions for the image data in a memory, said image forming conditions being at least one of: number of copies, magnification and paper size.

4. The image forming apparatus of claim 2, wherein the print control unit causes the printer to automatically print another image data newly read by the image reader after the discarding of image data from the image memory under the maintained image forming conditions in the mode memory.

* * * * *